US011358113B2

(12) United States Patent
Strohm et al.

(10) Patent No.: US 11,358,113 B2
(45) Date of Patent: Jun. 14, 2022

(54) NON-THERMAL MICRO-PLASMA CONVERSION OF HYDROCARBONS

(71) Applicant: H Quest Vanguard, Inc., Pittsburgh, PA (US)

(72) Inventors: James J. Strohm, Allison Park, PA (US); George L. Skoptsov, Pittsburgh, PA (US); Evan T. Musselman, Pittsburgh, PA (US); Kurt W. Zeller, Pittsburgh, PA (US)

(73) Assignee: H QUEST VANGUARD, INC., Pittsburgh, PA (US)

( * ) Notice: Subject to any disclaimer, the term of this patent is extended or adjusted under 35 U.S.C. 154(b) by 562 days.

(21) Appl. No.: 15/671,629

(22) Filed: Aug. 8, 2017

(65) Prior Publication Data

US 2019/0046947 A1    Feb. 14, 2019

(51) Int. Cl.
*B01J 19/12*   (2006.01)
*C01B 32/184*  (2017.01)
*B01J 19/08*   (2006.01)

(52) U.S. Cl.
CPC .......... *B01J 19/126* (2013.01); *B01J 19/088* (2013.01); *C01B 32/184* (2017.08);
(Continued)

(58) Field of Classification Search
CPC .............. B01J 19/126; B01J 2219/0894; B01J 2219/1206; B01J 2219/1239;
(Continued)

(56) References Cited

U.S. PATENT DOCUMENTS 2,541,077 A * 2/1951 Leffer ................ C10G 11/18
422/144
2,697,686 A * 12/1954 Letter ................. B01J 8/125
422/207

(Continued)

FOREIGN PATENT DOCUMENTS

WO    2015189643 A1    12/2015

OTHER PUBLICATIONS

Menendez et al., Thermal Treatment of Active Carbons: A Comparison Between Microwave and Electrical Heating, International Microwave Power Institute, Journal of Microwave Power and Electromagnetic Energy, vol. 34, No. 3, 1999, pp. 137-143.

(Continued)

*Primary Examiner* — Nicholas A Smith
*Assistant Examiner* — Colleen M Raphael
(74) *Attorney, Agent, or Firm* — Fox Rothschild LLP

(57) ABSTRACT

Embodiments relate to generating non-thermal plasma to selectively convert a precursor to a product. More specifically, plasma forming material, a precursor material, and a plasma promoter material are provided to a reaction zone of a vessel. The reaction zone is exposed to microwave radiation, including exposing the plasma forming material, the precursor material, and the plasma promoter material to the microwave radiation. The exposure of the plasma forming material and the plasma promoter material to the microwave radiation selectively converts the plasma forming material to a micro-plasma. The precursor material is mixed with the plasma forming material and the precursor material is exposed to the micro-plasma. The exposure of the precursor material to the micro-plasma and the microwave radiation selectively converts the precursor material to a product.

26 Claims, 5 Drawing Sheets

(52) U.S. Cl.
CPC ............................ *B01J 2219/0869* (2013.01);
*B01J 2219/0875* (2013.01); *B01J 2219/0892*
(2013.01); *B01J 2219/0894* (2013.01); *B01J*
*2219/0896* (2013.01); *B01J 2219/1206*
(2013.01); *B01J 2219/1215* (2013.01); *B01J*
*2219/1239* (2013.01); *B01J 2219/1293*
(2013.01)

(58) Field of Classification Search
CPC ........ B01J 2219/0875; B01J 2219/0892; B01J
2219/0896; B01J 2219/1293; B01J
2219/0869; B01J 2219/1215; B01J
19/088; C01B 32/184
USPC .......................... 204/157.43, 157.47, 157.52
See application file for complete search history.

(56) References Cited

U.S. PATENT DOCUMENTS

| | | | | |
|---|---|---|---|---|
| 3,142,543 | A * | 7/1964 | Slyngstad et al. | B01J 8/28 422/144 |
| 4,574,038 | A * | 3/1986 | Wan | B01J 19/126 204/157.15 |
| 6,099,696 | A | 8/2000 | Schwob et al. | |
| 6,184,427 | B1 * | 2/2001 | Klepfer | C10G 1/10 201/2.5 |
| 6,207,023 | B1 | 3/2001 | Cha | |
| 6,245,309 | B1 * | 6/2001 | Etievant | B01J 19/088 204/164 |
| RE37,853 | E | 9/2002 | Detering et al. | |
| 6,689,192 | B1 | 2/2004 | Phillips et al. | |
| 7,132,621 | B2 | 11/2006 | Kumar et al. | |
| 7,758,838 | B2 | 7/2010 | Hung et al. | |
| 8,486,363 | B2 | 7/2013 | Hung et al. | |
| 8,486,364 | B2 | 7/2013 | Vanier et al. | |
| 8,784,617 | B2 | 7/2014 | Novoselov et al. | |
| 9,221,688 | B2 | 12/2015 | Hung et al. | |
| 9,293,302 | B2 | 3/2016 | Risby et al. | |
| 9,334,168 | B2 | 5/2016 | Fullterton et al. | |
| 9,862,602 | B1 * | 1/2018 | Riso | C01B 32/312 |
| 10,781,103 | B2 | 9/2020 | Tanner et al. | |
| 2003/0150709 | A1 * | 8/2003 | LaBarge | B01J 19/129 422/186.04 |
| 2003/0211030 | A1 * | 11/2003 | Olivier | B01J 19/088 423/447.3 |
| 2005/0253529 | A1 * | 11/2005 | Kumar | B01J 19/088 315/111.71 |
| 2006/0266636 | A1 * | 11/2006 | Stroder | B01J 19/126 204/157.15 |
| 2007/0029291 | A1 | 2/2007 | Boulos et al. | |
| 2009/0294273 | A1 * | 12/2009 | Monsen | C01B 32/162 204/156 |
| 2010/0301212 | A1 | 12/2010 | Dato et al. | |
| 2010/0314788 | A1 | 12/2010 | Hung et al. | |
| 2012/0029252 | A1 * | 2/2012 | Lissianski | C10B 19/00 422/165 |
| 2012/0297665 | A1 * | 11/2012 | Goerz, Jr. | B01J 19/088 422/186.21 |
| 2013/0084237 | A1 | 4/2013 | Vanier et al. | |
| 2014/0170057 | A1 | 7/2014 | Huang et al. | |
| 2014/0231417 | A1 * | 8/2014 | Barton | H05H 1/46 219/688 |
| 2015/0041309 | A1 | 2/2015 | Spitzl | |
| 2019/0006151 | A1 * | 1/2019 | Pau | H05H 1/46 |
| 2020/0402768 | A1 | 12/2020 | Stowell et al. | |

OTHER PUBLICATIONS

Dawson et al., A System to Investigate the Remediation of Organic Vapors Using Microwave-Induced Plasma with Fluidized Carbon Granules, Review of Scientific Instruments, vol. 80, No. 3, 2009, pp. 1-13.

Lebedev, Yu. A., Microwave Discharges at Low Pressures and Peculiarities of the Processes in Strongly Non-Uniform Plasma, Plasma Sources Science and Technology, vol. 24, Oct. 2015, pp. 1-39.

Jahanmiri et al., Naphtha Cracking Through a Pulsed DBD Plasma Reactor: Effect of Applied Voltage, Pulse Repetition Frequency and Electrode Material, Chemical Engineering Journal, vol. 191, May 2012, pp. 416-425.

Hunt et al., Microwave-Specific Enhancement of the Carbon-Carbon Dioxide (Boudouard) Reaction, The Journal of Physical Chemistry, 2013, vol. 117, pp. 26871-26880.

Khani et al., Study on the Feasibility of Plasma (DBD Reactor) Cracking of Different Hydrocarbons (n-Hexadecane, Lubricating Oil, and Heavy Oil), IEEE Transactions on Plasma Science, Sep. 2014. pp. 1-9.

Taghvaei et al., Hydrogen Production Through Plasma Cracking of Hydrocarbons: Effect of Carrier Gas and Hydrocarbon Type, The Chemical Engineering Journal, vol. 226, 2013, pp. 384-392.

Sekaran et al., Microwave Heating Characteristics of Graphite Based Powder Mixtures, International Communications in Heat and Mass Transfer, vol. 48, 2013, pp. 22-27.

Ahmed et al., Decomposition of Hydrocarbons to Hydrogen and Carbon, Applied Catalysis A: General, May 2009, pp. 1-24.

Rahimpour et al., Combination of Non-Thermal Plasma and Heterogeneous Catalysis for Methane and Hexadecane Co-Cracking: Effect of Voltage and Catalyst Configuration, Chemical Engineering Journal, vol. 219, Mar. 2013, pp. 245-253.

Lam et al., Pyrolysis Using Microwave Absorbents as Reaction Bed: An Improved Approach to Transform Used Frying Oil into Biofuel Product with Desirable Properties, Journal of Cleaner Production, vol. 147, Mar. 2017, pp. 263-272.

Torres et al., Hydrogen and Multiwall Carbon Nanotubes Production by Catalytic Decomposition of Methane: Thermogravimetric Analysis and Scaling-Up of Fe—Mo Catalysts, International Journal of Hydrogen Energy, Mar. 2014, pp. 3698-3709.

Omarov et al., On the Theory of Plasma Streamer Development, Bulletin of the Lebedev Physics Institute, 2009, vol. 36, No. 10, pp. 310-315.

Yamshchikov et al., Pulse Volume Discharges in High Pressure Gases, 12th International Conference on Gas Discharge Plasmas and Their Applications, Journal of Physics: Conference Series, vol. 652, 2015, pp. 1-5.

* cited by examiner

NON-THERMAL MICRO-PLASMA CONVERSION OF HYDROCARBONS

BACKGROUND

The present embodiments relate to utilizing non-thermal micro-plasma for conversion of a precursor material into a product. More specifically, the embodiments relate to utilizing microwave radiation to generate the non-thermal micro-plasma which facilitates the conversion of the hydrocarbons to a product.

Plasma is a state of matter which contains electrons and at least partially ionized atoms and/or molecules (e.g., ions). Plasma may be, but not limited to, thermal plasma and a non-thermal plasma. The thermal plasma is in local thermodynamic equilibrium where the electrons, ions, atoms, and molecules of the thermal plasma have a similar temperature. The non-thermal plasma is not in thermodynamic equilibrium. In the non-thermal plasma, the electrons have high electron temperatures comparative to the atoms, molecules, and/or ions which have a relatively low temperature.

Organic materials can be converted into products by pyrolysis. Plasma may be used to facilitate the pyrolysis of organic materials. However, utilizing plasma may have high capital costs, recurring costs, and resource utilization (e.g., power, cooling, etc.). Additionally, plasma can quickly deteriorate components of a reactor due to high temperatures and undesired side reactions.

SUMMARY

A system and method are provided for utilizing microwave radiation to generate non-thermal micro-plasma which facilitates the conversion of hydrocarbon to a product.

In one aspect, a method is provided for non-thermal micro-plasma conversion of a precursor material to a product. A plasma forming material, a hydrocarbon precursor material, and a plasma promoter material are provided to a reaction zone. The plasma forming material and plasma promoter material are exposed to microwave radiation within the reaction zone. The exposure selectively converts the plasma forming material to non-thermal micro-plasma. The hydrocarbon precursor material is exposed to both the non-thermal micro-plasma and the microwave radiation. The exposure of the hydrocarbon precursor material selectively converts the hydrocarbon precursor material to a product, which in one embodiment may be in the form of a carbon enriched material(s) and a hydrogen enriched material(s).

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The foregoing and other features, and advantages of the embodiments are apparent from the following detailed description taken in conjunction with the accompanying drawings in which:

DETAILED DESCRIPTION

Figure 1:
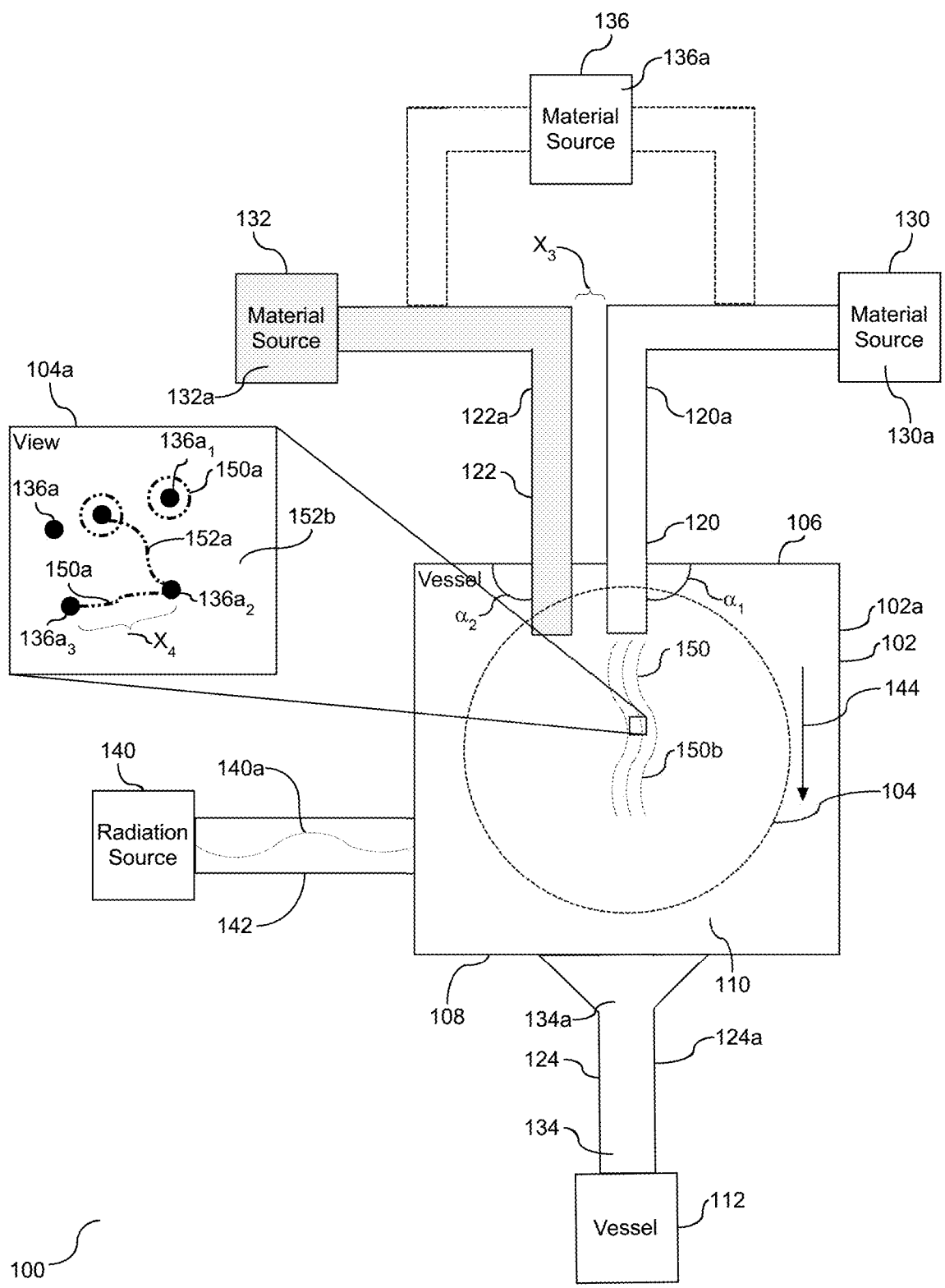
FIG. 1 depicts a block diagram illustrating a system for processing a precursor material into a product utilizing non-thermal plasma.

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and illustrates certain selected embodiments of devices, systems, and processes that are consistent with the embodiments as claimed herein.

Other than in any operating examples, or where otherwise indicated, all numbers expressing, for example, quantities of ingredients used in the specification and claims are to be understood as being modified in all instances by the term "about". The modifier "about" used in connection with a quantity is inclusive of the stated value and has the meaning dictated by the context (e.g., includes the degree of error associated with measurement of the particular quantity). Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits by applying ordinary rounding techniques.

Notwithstanding that the numerical ranges and parameters setting forth the broad scope of the embodiments are approximations, the numerical values set forth in the specific examples are reported as precisely as possible. Any numerical value, however, inherently contains certain errors necessarily resulting from the standard variation found in their respective testing measurements.

Unless the meaning is clearly to the contrary, all references made herein to ranges are to be understood as inclusive of the endpoints of the ranges. Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Unless the meaning is clearly to the contrary, all references made herein to pressures, such as psi, are to be understood as relative to atmospheric pressure.

Thermal plasma can be created by passing a gas, such as argon, through an electric arc. The electric arc will rapidly heat the gas by resistive and radiative heating to a high temperature (>9000 degrees Kelvin) within milliseconds of passing through the arc generating electrons and ions from the gas. The thermal plasma has electrons and ions which are similar temperatures (e.g., in thermodynamic equilibrium). The high temperature(s) may be detrimental to the reactants and/or products.

Generating plasma(s) may have large energy requirements and capital costs. Additionally, utilizing plasma(s) to support conversion of a hydrocarbon to a product may cause carbon soot build up in a reaction zone, which decreases efficiency of the conversion. Thus, a system and method are provided to efficiently generate non-thermal micro-plasma and/or limit carbon build up within the reaction zone of a system for hydrocarbon conversion. More specifically, a plasma forming material, a precursor material, and a plasma promoter material are provided to the reaction zone of a vessel. The reaction zone is exposed to microwave radiation, which exposes the plasma forming material, the precursor material, and the plasma promoter material to the microwave radiation. The exposure of the plasma forming material and the plasma promoter material to the microwave radiation selectively converts the plasma forming material to the non-thermal micro-plasma. The precursor material is mixed with the plasma forming material. This mixing exposes the precursor material to the non-thermal micro-plasma. The exposure of the precursor material to the non-thermal micro-plasma and the microwave radiation selectively converts the precursor material to a product.

Referring to FIG. 1, a block diagram (100) is provided illustrating a system for processing a precursor material into a product utilizing non-thermal plasma. In the system shown herein, a vessel (102) is provided to facilitate processing of the precursor material (132a). More specifically, the vessel (102) is configured with a cavity (110) and a reaction zone (104) within the cavity (110). The reaction zone (104) is configured to facilitate interaction of and/or mixing of various material(s) and generation of non-thermal plasma (150) including one or more micro-plasma (150a). The vessel (102) is provided with a vessel boundary (102a) (e.g., walls) to support and/or maintain the reaction zone (104). The size and/or location of the reaction zone (104) and/or non-thermal plasma (150) is for illustration purposes and is not limited to the identified region. The size and/or location of the reaction zone (104) and/or non-thermal plasma (150) may be dynamic. For example, in one embodiment, the reaction zone (104) may extend to a vessel boundary (102a) of the vessel (102). The vessel boundary (102a) may be comprised of any known or conceivable material capable of withstanding the heat, pressure(s), and chemical environments associated with generating and/or sustaining the non-thermal plasma (150). For example, the material of vessel boundary (102a) may be a microwave radiation opaque material (e.g., limits penetration of microwave radiation through the material). The microwave radiation opaque material may be, but is not limited to ceramics and metals or metal alloys, such as brass, copper, steel, nickel, stainless steel, titanium, and aluminum. In one embodiment, the vessel boundary (102a) is constructed of a microwave radiation reflective material. In one embodiment, the vessel (102) is operated at atmospheric pressure. Accordingly, the vessel (102) is configured to withstand the heat, pressure(s), and chemical environment(s) associated with processing the precursor material.

As shown, the vessel (102) is provided with multiple conduits for controlling ingress and egress of materials to and from the cavity (110), and more specifically, controlling ingress and egress to and from the reaction zone (104). For example, a first conduit (120) and a second conduit (122) are provided in communication with a first side (106) of the vessel (102). The first conduit (120) is at a first angle ($\alpha_1$) with respect to the vessel (102) and the second conduit is at a second angle ($\alpha_2$) with respect to the vessel (102). The positioning and orientation of the first and second conduits, (120) and (122), respectively, is for illustration purposes and should not be considered limiting. For example, in one embodiment, the first and second conduits, (120) and (122), respectively, may be provided in communication with different sides or boundaries of the vessel (102) and the first angle ($\alpha_1$) and second angle ($\alpha_2$) may be the same or may be different.

Regardless of the positioning, the first and second conduits, (120) and (122), respectively, control and/or facilitate ingress of material(s) to the cavity (110) of vessel (102), including ingress of materials to the reaction zone (104). Namely, the first conduit (120) is operatively coupled to a first material source (130). For example, the first conduit (120) is shown herein to control and/or facilitate ingress of a plasma forming material (130a) provided by the first material source (130) at a first flow rate to the reaction zone (104). In one embodiment, the first flow rate may have a gas hourly space velocity (GHSV) of 14,500 to 32,000 per hour, in another embodiment, the flow rate may have a GHSV of 100 to 14,500 per hour, and in another embodiment the flow rate may have a GHSV of 32,000 to 240,000 per hour. In one embodiment, the GHSV is measured at standard temperature and pressure (STP) (e.g., 273.15 degrees Kelvin and 1 atmosphere of pressure) based on a volume of the reaction zone (104).

As shown, the second conduit (122) is operatively coupled to a second material source (132). For example, the second conduit (122) is shown herein to control and/or facilitate ingress of a precursor material (132a) provided by material source (132) at a second flow rate to the reaction zone (104). The second flow rate may have a GHSV of 100 to 14,500 per hour, in another embodiment, the second flow rate may have a GHSV of 14,500 to 32,000 per hour, and in another embodiment the second flow rate may have a GHSV of 32,000 to 240,000 per hour. In one embodiment, the first flow has a minimal flow rate (e.g. GHSV of less than 100 per hr) and the second flow has the bulk flow rate (e.g., GHSV of greater than 1000 per hour and up to 240,000 per hour). In another embodiment, the flow rates may be reversed such that the first flow may has the bulk flow rate and the second flow has the minimal flow rate. In one embodiment, the first and/or second flow has solid particles entrained within the respective flow. In one embodiment, the first and second conduits, (120) and (122), respectively, may be, but are not limited to, a pipe, a tube, an orifice, a channel, a nozzle, an inlet, and combinations thereof. In one embodiment, the first and/or second conduits, (120) and (122), respectively, may be provided with a single injection port, or multiple injection ports. Accordingly, the first and second conduits, (120) and (122), respectively, control ingress of materials to the reaction zone (104).

As shown, at least one of the first conduit (120) and the second conduit (122) is operatively coupled to a third material source (136). For example, in one embodiment, the second conduit (122) may control and/or facilitate ingress of a plasma promoter material (136*a*) provided by material source (132) at a third flow rate to the reaction zone (104). In one embodiment, the first conduit (120) may control and/or facilitate ingress of a plasma promoter material (136*a*) provided by material source (132) at the third flow rate to the reaction zone (104). In one embodiment, the first and second conduits, (120) and (122), respectively, both control and/or facilitate ingress of the plasma promoter material (136*a*) at the third flow rate to the reaction zone (104). In one embodiment, a sixth conduit (not shown) is operatively coupled to the third material source (136) and may control and/or facilitate ingress of the plasma promoter material (136*a*) to the reaction zone (104). Accordingly, the plasma promoter material (136*a*) may be provided to the reaction zone (104) in a variety of different manners. The third flow rate may be 0.03 to 3.5 grams per liter of gas reactant flow (e.g., grams of plasma promoter material (136*a*) per liter of plasma forming material (130*a*) and/or precursor material (132*a*)), in another embodiment, the third flow rate may be 3.5 to 10.0 grams per liter of gas reactant flow, and in another embodiment the third flow rate may be 10 to 35 grams per liter of gas reactant flow.

As used herein, the term "precursor" refers to a substance from which a product (134*a*) is formed. The precursor material (132*a*) may comprise virtually any material, depending upon the desired composition of the product (134*a*) to be formed. The precursor material (132*a*) may comprise a hydrocarbon(s), hereinafter referred to as a hydrocarbon precursor material. The precursor material (132*a*) may be a hydrocarbon such as, but is not limited to, aromatic, alkylated aromatic, paraffinic, olefinic, cycloolefin, naphthenic, alkane, alkene, alkyl cycloalkane, alkylated cycoalkene, alkyne, alcohols, and a carbon and hydrogen based compound(s) containing one or more heteroatoms (e.g., a thiophene and a furan), and combinations thereof. For example, the precursor material (132*a*) may be, but is not limited to, methane, ethane, propane, butane, syngas, natural gas, ethylene, acetylene, methanol, ethanol, propanol, butanol, hexane, benzene, paraffin, naphthalene, styrene, vinyl chloride, 1,2-dichloroethane, allyl alcohol, propionaldehyde, vinyl bromide, and combinations thereof. It is understood that the precursor material (132*a*) may not be pure and can contain a variety of impurities as known in the art. For example, the precursor material (132*a*) can include the plasma forming material (130*a*) and/or a recycled process gas containing an intermediate product, product (134*a*), plasma forming material (130*a*), and/or unreacted precursor material (132*a*).

The plasma forming material (130*a*) may comprise virtually any material that can be used to generate plasma, such as, but not limited to, the non-thermal plasma (150). For example, the plasma forming material (130*a*) may be, but is not limited to, argon, hydrogen, helium, neon, krypton, xenon, carbon dioxide, nitrogen, synthesis gas, and water. It is understood that the plasma forming material (130*a*) may not be pure and may contain a variety of impurities as known in the art. In one embodiment, the plasma forming material (130*a*) may include precursor material (132*a*) and/or a recycled process gas containing an intermediate product, product (134*a*), plasma forming material (130*a*), and/or unreacted precursor material (132*a*). In one embodiment, the plasma forming material (130*a*) is chosen to have a first dielectric strength that is less than a second dielectric strength of the precursor material (132*a*). The lower dielectric strength of the plasma forming material (130*a*) in comparison to the precursor material (132*a*) facilitates non-thermal plasma (150) generation from the plasma forming material (130*a*). In one embodiment, the generation of the non-thermal plasma (150) from the plasma forming material (130*a*) is initiated prior to plasma generation from the precursor material (132). Accordingly, the plasma forming material (130*a*) is used to generate the non-thermal plasma (150).

The plasma promoter material (136*a*) may comprise virtually any material that can be used to promote the generation of plasma, such as, but not limited to, the non-thermal plasma (150) including to promote the generation of microplasma (150*a*). For example, the plasma promoter material (136*a*) may include, but is not limited to carbon black, coal, biochar, biomass, graphite, activated carbon, a transition metal, a supported transition metal, structured carbon, and combinations thereof. The transition metal may be, but is not limited to, iron, nickel, copper, molybdenum, tungsten, cobalt, palladium, and ruthenium. The transition metal may be supported on, but not limited to, carbon, alumina, silica, titanium oxide, magnesium oxide, carbon based materials, carbide based materials, and combinations thereof. It is understood that the plasma promoter material (136*a*) may not be pure and may contain a variety of impurities as known in the art. In one embodiment, the plasma forming material (130*a*) may include the precursor material (132*a*), and/or a recycled process gas containing an intermediate product, product (134*a*), plasma forming material (130*a*), and/or unreacted precursor material (132*a*). Accordingly, the plasma promoter material (136*a*) facilitates the generation of the non-thermal plasma (150).

The plasma promoter material (136*a*) is dispersed into the reaction zone (104) in a manner such that particles (e.g., liquid droplets, solids, etc.) of the plasma promoter material (136*a*) have a degree a separation as shown in the magnified view (104*a*) of the reaction zone (104). For example, at least two portions of the plasma promoter material (136*a*) are separated from one another by a secondary material such as, but not limited to, the plasma forming material (130*a*) and the precursor material (132*a*). In one embodiment, the plasma promoter material (136*a*) may contain solid particles (136*a*). The solid particles may be entrained within a gas flow. In one embodiment, the plasma promoter material (136*a*) may be entrained within a flow of the plasma forming material (130*a*) within the first conduit (120). Similarly, in one embodiment, the plasma promoter material (136*a*) may be entrained within a flow of the precursor material (132*a*) within the second conduit (122). Similarly the plasma promoter material (136*a*) may be fed into the reaction zone without being dispersed and upon exposure to the plasma forming material (130*a*) and/or precursor material (132*a*) within the reaction zone (104), the plasma promotor material (136*a*) becomes dispersed within the plasma forming material (130*a*) and/or precursor material (132*a*).

The plasma forming material (130*a*), the precursor material (132*a*), and the plasma promoter material (136*a*) are collectively referred to as reactants. The temperature of the reactants may be individually and/or collectively controlled or uncontrolled (e.g., subject to environmental fluctuations in temperature) within the first and second conduits, (120) and (122), respectively. In one embodiment, the plasma forming material (130*a*) is at a first temperature upon entering the first conduit (120), the precursor material (132a) is at a second temperature upon entering the second conduit (122), and the plasma promoter material (136a) is at a third temperature upon entering the first conduit (120) and/or second conduit (122). In one embodiment, the first, second, and third temperatures are between 100 and 1,000 degrees Kelvin and more preferably between 250 and 500 degrees Kelvin. Accordingly, the reactants may be provided to the vessel (102) with or without pre-heating and/or pre-cooling.

As shown, a third conduit (124) is provided in communication with a second side (108) of the vessel (102). The third conduit (124) controls and/or facilitates egress of material(s) from the cavity (110) of vessel (102), including egress of material(s) from the reaction zone (104). Namely, the third conduit (124) controls egress of a stream (134) from the reaction zone (104). The stream (134) may include, but is not limited to, the product (134a), the plasma forming material (130a) (e.g., unconverted, extinguished non-thermal plasma, etc.), the precursor material (132a) (e.g., unconverted, partially converted, etc.), the plasma promoter material (136a), and combinations thereof. In one embodiment, the third conduit (124) may be, but is not limited to, a pipe, a tube, an orifice, a channel, a nozzle, an outlet, and combinations thereof. The positioning of the third conduit (124) is for illustration purposes and should not be considered limiting. Accordingly, the third conduit (124) controls egress of materials from the reaction zone (104).

Each conduit (120), (122), and (124) is enclosed within a fixed boundary (e.g., walls). For example, the first conduit (120) is shown with a first boundary (120a), the second conduit (122) is shown with a second boundary (122a), and the third conduit (124) is shown with a third boundary (124a). The boundaries, (120a), (122a), and (124a), may be constructed of the same material, or in one embodiment different materials. For example, the boundaries may be constructed of, but not limited to, a microwave radiation opaque material, microwave radiation reflective material, and a microwave radiation transparent material (e.g., allows microwave radiation to penetrate through the material). The material of the boundaries, (120a), (122a), and (124a), may be any known or conceivable material capable of withstanding the heat, pressure(s), and chemical environmental associated with transporting materials within the respective conduit and/or generating the non-thermal plasma (150). For example, the boundaries, (120a), (122a), and (124a), may be may be comprised of a material such as, but are not limited to ceramics, glasses, and metals or metal alloys, such as brass, copper, steel, nickel, stainless steel, titanium, and aluminum. Accordingly, the materials of boundaries, (120a), (122a), and (124a), are capable of supporting transport of the reactants and the stream (134) within first, second, and third conduits, (120), (122), and (124), respectively.

As shown, a radiation source (140) is provided operatively coupled to the vessel (102). The radiation source (140) generates radio frequency (RF) radiation and/or microwave radiation, hereinafter referred to collectively as microwave radiation (140a). The frequencies of the microwave radiation (140a) may be in the range from 36 megahertz (MHz) to 300 gigahertz (GHz), more preferably 40 MHz to 6 GHz, and most preferably 400 MHz to 3 GHz. For example, the microwave radiation frequency may be, but is not limited to, 915 MHz and 2.45 GHz. The radiation source (140) may be, but is not limited to, a magnetron.

The operative coupling of the radiation source (140) to the vessel (102) facilitates subjecting the reaction zone (104) to the microwave radiation (140a), which facilitates a selective conversion of precursor material (132a) to product (134a) and generation of the non-thermal plasma (150) including generation of the micro-plasma (150a). In one embodiment, the coupling between radiation source (140) and vessel (102) is direct. In one embodiment, a waveguide (142) is provided between and in communication with the radiation source (140) and the vessel (102). In one embodiment, there are a plurality of radiation sources (140). The plurality of radiation sources (140) may be coupled to a single waveguide (142) or a plurality of waveguides (142). Regardless of the coupling method, the microwave radiation (140a) within the reaction zone (104) is at a concentration ranging from 100 watts (W) per liter to 300 Kilowatts (kW) per liter within the reaction zone (104), more preferably between 1 and 80 kW per liter within the reaction zone (104), and most preferably between 2 and 30 kW per liter within the reaction zone (104). In one embodiment, the microwave radiation (140a) within the reaction zone (104) is at a concentration of less than 50 kW per liter, more preferably less than 30 kW per liter, and most preferably less than 15 kW per liter. Accordingly, the reaction zone (104) is subjected to microwave radiation (140a) generated by the radiation source (140).

Within the reaction zone (104), the reactants are subject to mixing and/or interaction with one another and exposed to the microwave radiation (140a). In one embodiment, the reactants traverse through the reaction zone (104) in flow direction (144). The exposure of at least one of the reactants to the microwave radiation (140a) generates the non-thermal plasma (150) including generates micro-plasma (150a). More specifically, in one embodiment, upon subjecting the plasma promoter material (136a) to the microwave radiation (140a), one or more particles, such as first particle ($136a_1$), of the plasma promoter material (136a) accumulate an electric charge. Upon accumulating a threshold electric charge (e.g., the dielectric strength of the plasma forming material (130a)), the plasma forming material (130a) becomes locally ionized proximally to the first particle ($136a_1$) in the form of micro-plasma (150a). In one embodiment, the micro-plasma (150a) may have a shape which encompasses a shape of the first particle ($136a_1$). Accordingly, a single particle may ignite the micro-plasma (150a).

The micro-plasma (150a) may be ignited between multiple particles. For example, upon subjecting the plasma promoter material (136a) to the microwave radiation (140a), two or more particles, such as second and third particles, ($136a_2$) and ($136a_3$), respectively, of the plasma promoter material (136a) accumulate an electric charge. In one embodiment, the second particle ($136a_2$) is positively charged. In one embodiment, the second particle ($136a_2$) is negatively charged. In one embodiment, the charge accumulation on the third particle ($136a_3$) may be the same net charge as the second particle ($136a_2$) (e.g., both negative or both positive), and the net charges of the second and third particles, ($136a_2$) and ($136a_3$), respectively, may have a localized charge differential(s) resulting in an electric potential differential between the second and third particles, ($136a_2$) and ($136a_3$), respectively. Regardless, of which type of charge the second particle ($136a_2$) accumulates, the electric potential difference is created between the second and third particles, ($136a_2$) and ($136a_3$), respectively. In one embodiment, the plasma forming material (130a) and/or precursor material (132a) may act as an insulator between the second and third particles, ($136a_2$) and ($136a_3$), respectively. The insulator enables particles that are not touching but may be closely spaced to have varying electric charges. Accordingly, the type of charge and particles which accumulate the charge is for illustration purposed only and should not be considered limiting.

Due to the electric potential difference, electrons are attracted towards a positively charged particle (e.g., anode) and nuclei are attracted towards a negatively charged particle (e.g., cathode). For example, the second particle ($136a_2$) has a region of a localized positive charge and the third particle ($136a_3$) has a region of a localized negative charge. When the electrical potential difference reaches a threshold value (e.g., the dielectric strength of the plasma forming material (130a)), the plasma forming material (130a) becomes locally ionized between the second and third particles, ($136a_2$) and ($136a_3$), respectively, in the form of micro-plasma (150a). More specifically, the increase in the electrical potential difference and/or adsorption of microwave energy by the plasma forming material (130a), promotes electron and ion impacts/collisions within but not limited to a portion of atoms and/or molecules of the plasma forming material (130a) and/or precursor material (132a), which results in ionization of the portion of atoms and/or molecules of the plasma forming material (130a) and/or precursor material (132a). For example, at least one valence electron is activated and/or excited from a first atom and/or molecule in the plasma forming material (130a). In one embodiment, the plasma forming material (130a) transforms from an insulator to a conductor upon the electrical potential difference reaching the threshold value. In one embodiment, the plasma forming material (130a) is at least partially ionized (e.g., greater than 0 percent to 100 percent) and converted to the non-thermal plasma (150). In one embodiment, the electric potential difference needed to generate a micro-plasma (150a) may be affected by a distance ($X_4$) between two or more subject particles (136a). Accordingly, the electric potential difference needed to generate the micro-plasma (150a) is affected by a variety of factors.

Elastic and inelastic collisions between species, such as but not limited to electrons, non-thermal plasma (150), ions, atoms and/or molecules of plasma forming material (130a) and/or precursor material (132a), radical species, product (134a), and/or intermediate product(s) present in the reaction zone (104) results in energy transfer either directly or indirectly to the plasma forming material (130a), precursor material (132a), product (134a), and/or intermediate product(s). Energy transfer can excite (and/or increase the energy level) vibrational, electronic, rotational, and translational energy state(s) of the atoms and/or molecules of the plasma forming (130a) and/or precursor material (132a). In one embodiment, transfer of energy to vibrational and electronic energy states is greater than transfer of energy to translational energy state within the non-thermal plasma (150). In one embodiment the energy states of the non-thermal plasma (150) are not in thermodynamic equilibrium such that the electron and/or vibrational temperature are greater than rotational, ion, and/or translation temperatures. In one embodiment the measured temperature of various excited species present in the non-thermal plasma (150) are not equal. For example, the plasma forming material (130a) may have electrons at a first temperature which is different than a second temperature of $C_2$ species present in the reaction zone (104) and/or different than a blackbody temperature of the reaction zone (104). In one embodiment, the precursor material (132a) is at least partially converted to the non-thermal plasma (150). Accordingly, the non-thermal plasma (150) is generated within the reaction zone (104) by the microwave radiation (140a).

Each micro-plasma (150a) may increase a second electrical potential difference between the particles utilized to form the micro-plasma (150a) and a secondary adjacent particle(s) (not shown). Upon increasing of the second electric potential difference, a second micro-plasma (not-shown) is generated between the particles utilized to form the micro-plasma (150a) and the secondary adjacent particle(s). The non-thermal plasma (150) and micro-plasma (150a) generation process progresses through the reaction zone (104) in this manner. Accordingly, the micro-plasma (150a) is formed locally between particles and may initiate other micro-plasma(s).

The electron temperature within the non-thermal plasma (150) is a first electron temperature. In one embodiment, the first electron temperature is between 800 and 6,000 degrees Kelvin, more preferably between 900 and 3,000 degrees Kelvin, and more preferably between 1,000 and 2,500 degrees Kelvin. In one embodiment, the first electron temperature is less than 8,000 degrees Kelvin. In one embodiment, the first temperature is not subject to an increase in temperature after a threshold microwave radiation density is reached within the reaction zone (104). In one embodiment, the threshold microwave radiation density within the reaction zone (104) is 15 kW per liter, more preferably 9 kW per liter, and more preferably 4 kW per liter. In one embodiment, the threshold microwave radiation density is dependent on the space between particles of the plasma promoter material (136a). It is understood that the threshold microwave radiation density may be dependent on the reactants introduced to the reaction zone (104) and/or configuration of the reaction zone (104). Thus, the threshold microwave radiation density may vary from the values illustrated.

The non-thermal plasma (150) within reaction zone (104) is transient and dynamically changing. In one embodiment, the non-thermal plasma (150) has a non-uniform radiation intensity (e.g., degree of ionization, electron temperature, etc.) within the reaction zone (104). For example, there is an area(s) of high radiation intensity (152a) (e.g., the micro-plasma (150a)), and an area(s) of low radiation intensity (152b) (e.g., absence of the micro-plasma (150a)). In one embodiment, the area(s) of high radiation intensity (152a) is at the first electron temperature while the area(s) of low radiation intensity (152b) is at second electron temperature. In one embodiment, the second electron temperature is lower than the first electron temperature. Accordingly, the non-thermal plasma (150) may be constantly and/or dynamically changing within reaction zone (104).

In one embodiment, the non-thermal plasma (150) is primarily formed from the plasma forming material (130a). For example, on a molar basis, the non-thermal plasma (150) is comprised of at least 50 percent plasma forming material (130a), in another embodiment, the non-thermal plasma (150) is comprised of at least 75 percent plasma forming material (130a) ions and electrons, and in another embodiment the non-thermal plasma (150) is comprised of at least 90 percent plasma forming material (130a) ions and electrons. The non-thermal plasma (150), including the micro-plasma (150a), initiates and/or continues selective conversion of the precursor material (132a) to the product (134a). For example, the micro-plasma (150a) may act as an energy transfer catalyst activating the precursor material (132a). The ions and electrons within the micro-plasma (150a) collide with the precursor material (132a). The collisions result in energy transfer sufficient to promote cleavage of a bond (e.g., hydrogen atom to a carbon atom bond) of the precursor material (132a). For example, if the precursor material (132a) is methane, the $H_3C$—H bond is cleaved by the collisions.

Following interaction with the non-thermal plasma (150), the non-thermal plasma (150) dynamically changes composition. For example, the precursor material (132a) receives a threshold amount of energy from the collision(s) with the ions and electrons within the non-thermal plasma (150) and/or receives a threshold amount of energy from the microwave radiation (140a) wherein the precursor material (132a) is at least partially ionized (e.g., greater than 0 percent to 100 percent). After receiving the threshold amount of energy, the precursor material (132a) selectively converts into a non-thermal plasma (150b). In one embodiment, the non-thermal plasma (150b) has a $C_2$ species temperature range of 1,500 to 5,500 degrees Kelvin, and in one embodiment, a $C_2$ species temperature range of 2,000 to 3,500 degrees Kelvin. Accordingly, the non-thermal plasma (150) changes composition along a distance of the reaction zone (104).

Exposure of the precursor material (132a) to the reaction zone (104) including exposure to the non-thermal plasma (150), and microwave radiation (140a), selectively converts the precursor material (132a) into the product (134a). In one embodiment, the product (134a) comprises a carbon enriched material and a hydrogen enriched material. The carbon enriched material has a hydrogen atom to carbon atom ratio of less than or equal to one. For example, the carbon enriched material may include, but is not limited to, a graphitic material, amorphous carbon, structured carbon, and ordered carbon. The carbon enriched material may include graphene and/or graphite. The hydrogen enriched material has a hydrogen atom to carbon atom ratio greater than 1. The hydrogen enriched material may include, but is not limited to, hydrogen, ethylene, acetylene, butadiene, butane, and combinations thereof. In one embodiment, the conversion percentage of the precursor material (132a) to the product (134a) on a molar basis may be, but is not limited to, at least 5 percent, at least 30 percent, at least 70 percent, at least 90 percent, and at least 99 percent. For example, in one embodiment, the conversion percentage of the precursor material (132a) to the product (134a) on a molar basis of may be between 30 and 70 percent. Accordingly, the precursor material (132a) is selectively converted to the product (134a) within reaction zone (104).

In one embodiment, the microwave radiation (140a) within the reaction zone (104) lowers the effective activation energy required for a chemical reaction, such as the selective conversion of the precursor material (132a) to the product (134a). For example, the microwave radiation (140a) can act locally on a microscopic scale by exciting electrons of a group of specific atoms in contrast to global heating of the entire cavity (110) of the vessel (102) which raises a bulk temperature of all materials (e.g., plasma forming material (130a), precursor material (132a), vessel boundary (102a), plasma promoter material (136a), etc.) within the cavity (110). In one embodiment, the micro-plasma can act locally on a microscopic scale by exciting electrons of a group of specific atoms. Raising the temperature of all materials within the cavity (110) of the vessel (102) may utilize more energy than the effective activation energy for the conversion of the precursor material (132a) into the product (134a). Accordingly, utilizing the non-thermal plasma (150), including the micro-plasma, enables localized heating and/or energy transfer, which results in a decrease in the energy requirements to selectively convert the precursor material (132a) to the product (134a).

After the plasma forming material (130a), the unconverted precursor material (132a), and product (134a) are subject to microwave radiation (140a) below their respective dielectric strengths, the non-thermal plasma (150) is extinguished (e.g., the non-thermal plasma (150) transitions to non-ionized or minimally ionized state). The extinguished non-thermal plasma (150), remainder of the plasma forming material (130a), unconverted precursor material (132a), partially converted precursor material (132a), plasma promoter material (136a), and product (134a) egress from the reaction zone (104) into the third conduit (124) as components of the stream (134). In one embodiment, the bulk temperature of the stream (134) is between 350 and 3000 degrees Kelvin and more preferably between 500 and 1500 degrees Kelvin. In one embodiment, the bulk temperature of the stream (134) is obtained prior to cooling of the stream (134). In one embodiment, a residence time of the reactants within the reaction zone (104) is between 15 milliseconds and 30 seconds. In one embodiment, at least a portion and/or component of the stream (134) are returned to the reaction zone (104) through a fourth conduit (not shown) for recycling. The fourth conduit (not shown) is operatively coupled to the third conduit (126) and at least one of the first conduit (120) and second conduit (122). Accordingly, the stream (134) comprises effluent egressing from the reaction zone (104).

The third conduit (124) is operatively coupled to a container (112) to collect the product (134a). The container (112) may be any known or conceivable material capable of withstanding heat, pressure(s), and the chemical environment(s) associated with the product (134a). For example, the container (112) may be constructed of, but is not limited to ceramics, and metals or metal alloys, such as brass, copper, steel, nickel, stainless steel, titanium, and aluminum. In one embodiment, the vessel (102) is oriented such that particles (e.g., solids, liquids of product (134a), etc.) free-fall through the third conduit (124) (e.g., down-flow). In one embodiment, the vessel (102) is oriented such that particles (e.g., solids, liquids of products (134a), etc.) require an applied force to exit in stream (134) in the third conduit (124) (e.g., up-flow). In one embodiment, the vessel (102) is oriented for a horizontal flow. In one embodiment, the vessel (102) is configured for counter flow of at least two of the precursor material (132a), plasma forming material (130a), and/or plasma promoter material (136a). Accordingly, the container (112) is configured to receive the product (134a) from the third conduit (124).

In one embodiment, the precursor material (132a) is methane. The methane is selectively converted into a carbon enriched material utilizing the system of FIG. 1 according to, but not limited to, the following reactions:

$$CH_4 \rightarrow CH_3 + H \tag{1}$$

$$CH_4 + H \rightarrow CH_3 + H_2 \tag{2}$$

$$CH_4 + H \rightarrow CH_3 + H_2 \tag{3}$$

$$C_2H_6 \rightarrow C_2H_4 + H_2 \tag{4}$$

$$C_2H_4 \rightarrow C_2H_2 + H_2 \tag{5}$$

$$C_2H_2 \rightarrow \text{carbon based material} + H_2 \tag{6}$$

In one embodiment, reactions (1)-(6) occur in the reaction zone (104) of vessel (102), and at least one of the reactions (1)-(6) is facilitated by the non-thermal plasma (150). In one embodiment, the microwave radiation (140a) within the reaction zone (104) lowers an effective activation energy required for at least one of reactions (1)-(6) to proceed. The carbon enriched material produced from methane has a hydrogen atom to carbon atom ratio of less than or equal to one. For example, the carbon enriched material may include, but is not limited to, a graphitic material, amorphous carbon, structured carbon, and ordered carbon. The carbon enriched material may include graphene and/or graphite. Accordingly, methane may be selectively converted into graphene and/or graphite utilizing the non-thermal micro-plasma.

In one embodiment, the plasma forming material (130a) and/or precursor material (132a) may include an additive such as, but are not limited to, carbon black, coal, biochar, biomass, graphite, coke, structured carbon, carbon dioxide, carbon monoxide, and hydrogen. The additive may accelerate the conversion of the precursor material to the product. In one embodiment, the additive is exposed to the microwave radiation (140a) and/or the non-thermal plasma (150). In one embodiment, the additive is upgraded to a third material responsive to the exposure. In one embodiment, the upgrading may change the chemical, physical, and/or structural properties of the additive. For example, conductivity of the additive can be increased through re-ordering and/or functionalization of the additive's surface or bulk structure (e.g., carbon black may be upgraded to conductive carbon black). In one embodiment, the additive's surface area and/or porosity may be altered (carbon to activated carbon). In one embodiment, graphite may be upgraded to, but not limited to, a graphene sheet. In one embodiment, the additive increases conversion of the precursor material (132a) to product (134a). Accordingly, an additive may be added to the system for accelerated and/or increased conversion of the precursor material (132a) and/or generation of a third material.

Figure 2:
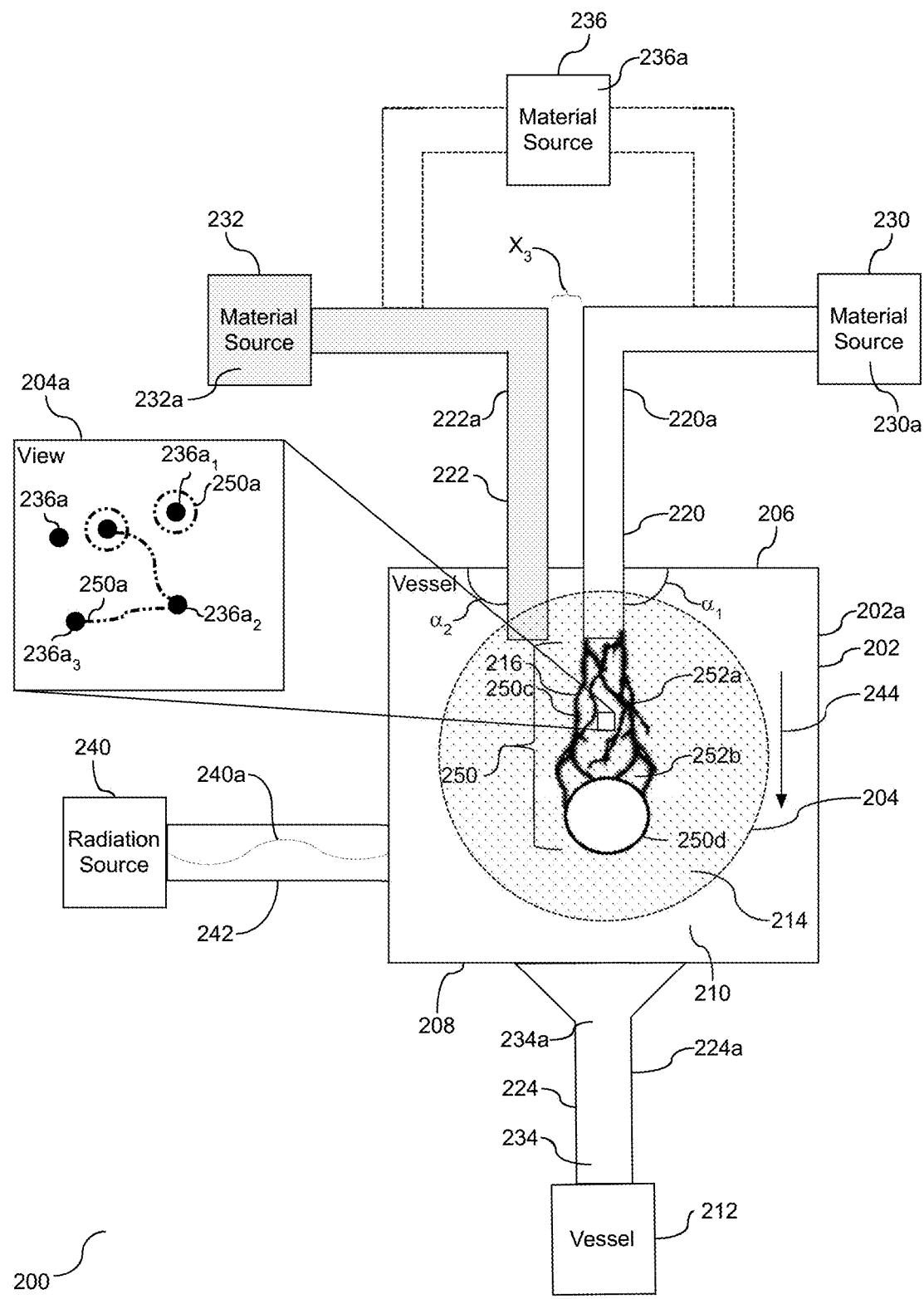
FIG. 2 depicts a block diagram illustrating a system for processing the precursor material into a product utilizing non-thermal micro-plasma and streamers.

Referring to FIG. 2, a block diagram (200) is provided illustrating a system for processing a precursor material into a product utilizing non-thermal micro-plasma and streamers. As shown, a vessel (202) is provided with multiple conduits configured to control ingress and egress of materials to and from a reaction zone (204) within a cavity (210) of the vessel (202). For example, a first conduit (220) and a second conduit (222) are provided in communication with a first side (206) of the vessel (202). The first and second conduits, (220) and (222), control and/or facilitate ingress of material(s) to the cavity (210) of vessel (202), including ingress of material(s) to the reaction zone (204). Namely, the first conduit (220) is operatively coupled to a first material source (230), and the first conduit (220) controls and/or facilitates ingress of a plasma forming material (230a) provided by the first material source (230) to the reaction zone (204). Similarly, the second conduit (222) is operatively coupled to a second material source (232), and the second conduit (222) controls and/or facilitates ingress of a precursor material (232a) provided by the second material source (232) to the reaction zone (204). At least one of the first conduit (220) and the second conduit (222) is operatively coupled to a third material source (236). Accordingly, a plurality of conduits control ingress of materials to the reaction zone (204).

The plasma forming material (230a), precursor material (232a), and plasma promoter material (236a) enter the reaction zone (204) and are subjected to microwave radiation (240a) from radiation source (240). A non-thermal micro-plasma (250) is generated from at least one of the plasma forming material (230a), precursor material (232a), and plasma promoter material (236a). For example, the plasma forming material (230a) becomes locally ionized proximal to and/or between first and second particles, ($236a_1$) and ($236a_2$), respectively, in the form of a micro-plasma (250a) as shown in magnified view (204a) of the reaction zone (204).

A plasma in the form of a streamer discharge (250c), hereinafter referred to as a streamer, may also be generated within the reaction zone (204). For example, upon subjecting the plasma forming material (230a) to the microwave radiation (240a) and/or non-thermal plasma (250) which meets or exceeds the dielectric strength of the plasma forming material (230a), a valence electron is activated and/or excited from a first atom and/or molecule in the plasma forming material (230a). Upon excitation, the valence electron is removed from the first atom and/or molecule within the plasma forming material (230a) and accelerated in a select direction based on a first electric field (214) generated by the microwave radiation (240a) within the vessel (202). The accelerated electron strikes a second atom and/or molecule within the plasma forming material (230a) causing removal of an electron from the second atom and/or molecule. The electron removal process progresses through the reaction zone (204) in this manner and results in an electron avalanche. The electrons within the electron avalanche have a third electron temperature.

The electron avalanche comprises an ionized head region which is proximal to the direction of propagation of the electron avalanche and proximal to an adjacently positioned tail region. A space charge is produced by the electron avalanche causing a distortion of a second electric field (216) within the electron avalanche such that free electrons move towards the ionized head region, thereby increasing the strength of the second electric field (216) within the electron avalanche. The increase in the strength of the second electric field (216) facilitates additional electron avalanches to cumulate in the ionized head region causing the quantity of free electrons in the ionized head region to increase, which increases the strength of the second electric field (216). As the electron avalanche propagates, the positive ions (e.g., the atoms and/or molecules that have at least one electron removed) are left in the tail region of the electron avalanche. The tail region progresses through the reaction zone (204) slower than the ionized head region progresses through the reaction zone (204). An increase in free electrons in the ionized head region causes the first electric field (214) inside of the vessel (202) to increase in strength.

As the electron avalanche progresses through the reaction zone (204) and the first electrical field (214) within the vessel (202) increases to a threshold charge, the ionized head region begins to decelerate and the electron temperature of the ionization head region decreases to a fourth electron temperature. In one embodiment, the fourth electron temperature is less than the third electron temperature. Following the deceleration, the electron avalanche transitions into a streamer (250c). In one embodiment, the streamer (250c) is a type of non-thermal plasma with an excess of free electrons. Similarly, in one embodiment, the streamer (250c) has a longitudinal size that exceeds its transverse radius. A distortion of the sizing of the streamer (250c) results in a radiation intensity (e.g., degree of ionization, electron temperature, etc.) in the longitudinal direction of the streamer (250c) that is higher than the radiation intensity in the radial direction of the streamer. In one embodiment, the longitudinal direction of the streamer (250c) is relatively parallel to the flow direction (244) within the reaction zone (204). In one embodiment, the radial direction of the streamer (250c) is relatively perpendicular to the flow direction (244).

Upon transition of the electron avalanche to the streamer (250c), the electron temperature within the streamer (250c) continues to decrease to a fifth electron temperature. In one embodiment, the fifth electron temperature is less than the fourth electron temperature. In one embodiment, the fifth electron temperature is between 800 and 6,000 degrees Kelvin, more preferably between 900 and 3,000 degrees Kelvin, and more preferably between 1,000 and 2,500 degrees Kelvin.

Additionally, due to the increase of strength in the first and second electrical fields, (214) and (216), respectively, additional electron avalanche(s) are initiated resulting in an additional streamer(s) (250a) and/or micro-plasma(s) (250a). The additional electron avalanches may be negative charge directed (e.g., propagating towards a negative charge) and/or positively charge directed (e.g., propagating towards a positive charge). Accordingly, the micro-plasma (250a) and/or streamers (250c) may initiated additional micro-plasma and/or streamers.

The streamers (250c) within reaction zone (204) are transient and dynamically changing. In one embodiment, any single streamer (250c) is only present for a short period of time (e.g., less than 1 second). In one embodiment, the non-thermal plasma (250) has a non-uniform radiation intensity (e.g., degree of ionization, electron temperature, etc.) within the reaction zone (204). For example, there is an area(s) of high radiation intensity (252a) (e.g., the streamers (250c) and/or micro-plasma (250a)), and an area(s) of low radiation intensity (252b) (e.g., absence of streamers (250c) and/or micro-plasma (250a)). In one embodiment, the area(s) of high radiation intensity (252a) is at the fifth electron temperature while the area(s) of low radiation intensity (252b) is at a sixth electron temperature. In one embodiment, the sixth electron temperature is lower than the fifth electron temperature. Accordingly, the non-thermal plasma (250) may be constantly and/or dynamically changing within reaction zone (204).

In one embodiment, the streamers (250a) are primarily formed from the plasma forming material (230a). For example, on a molar basis, the streamers (250c) are comprised of at least 50 percent plasma forming material (230a), in another embodiment, the streamers (250c) are comprised of at least 75 percent plasma forming material (230a) ions and electrons, and in another embodiment the streamers (250c) are comprised of at least 90 percent plasma forming material (130a) ions and electrons. The streamers (250c) initiate and/or continue selective conversion of the precursor material (232a) to the product (234a). For example, the streamers (250c) may act as an energy transfer catalyst activating the precursor material (232a). The ions and electrons within the streamers (250c) collide with the precursor material (232a). The collisions result in energy transfer sufficient to promote cleavage of a bond (e.g., hydrogen atom to a carbon atom bond) of the precursor material (232a). For example, if the precursor material (232a) is methane, the $H_3C$—H bond is cleaved by the collisions.

Following interaction with the non-thermal plasma (250), the precursor material (232a), plasma forming material (230a), micro-plasma (250a), and/or streamers (250c) form a convergence point (250d) within the non-thermal plasma (250). At the convergence point (250d), the non-thermal plasma (250) dynamically changes composition. For example, the micro-plasma (250a) and/or streamers (250c) formed from the plasma forming material (230a) converge, and in one embodiment, begin to extinguish (e.g., become less ionized). In one embodiment, the precursor material (232a) receives a threshold amount of energy from the collision(s) with the ions and electrons within the non-thermal plasma (250) and/or receives a threshold amount of energy from the microwave radiation (240a) wherein the precursor material (232a) is at least partially ionized (e.g., greater than 0 percent to 100 percent). After receiving the threshold amount of energy, the precursor material (232a) selectively converts into a non-thermal plasma (250c) within the convergence point (250d). In one embodiment, the non-thermal plasma (250c) has a $C_2$ species temperature range of 1,500 to 5,500 degrees Kelvin, and in one embodiment, a $C_2$ species temperature range of 2,000 to 3,500 degrees Kelvin. In one embodiment, the radiation intensity of the non-thermal plasma (250) is more uniform at the convergence point (250d) than at the streamers (250c) and/or micro-plasma (250a). Accordingly, the non-thermal plasma (250) changes composition along a distance of the reaction zone (204).

Figure 3:
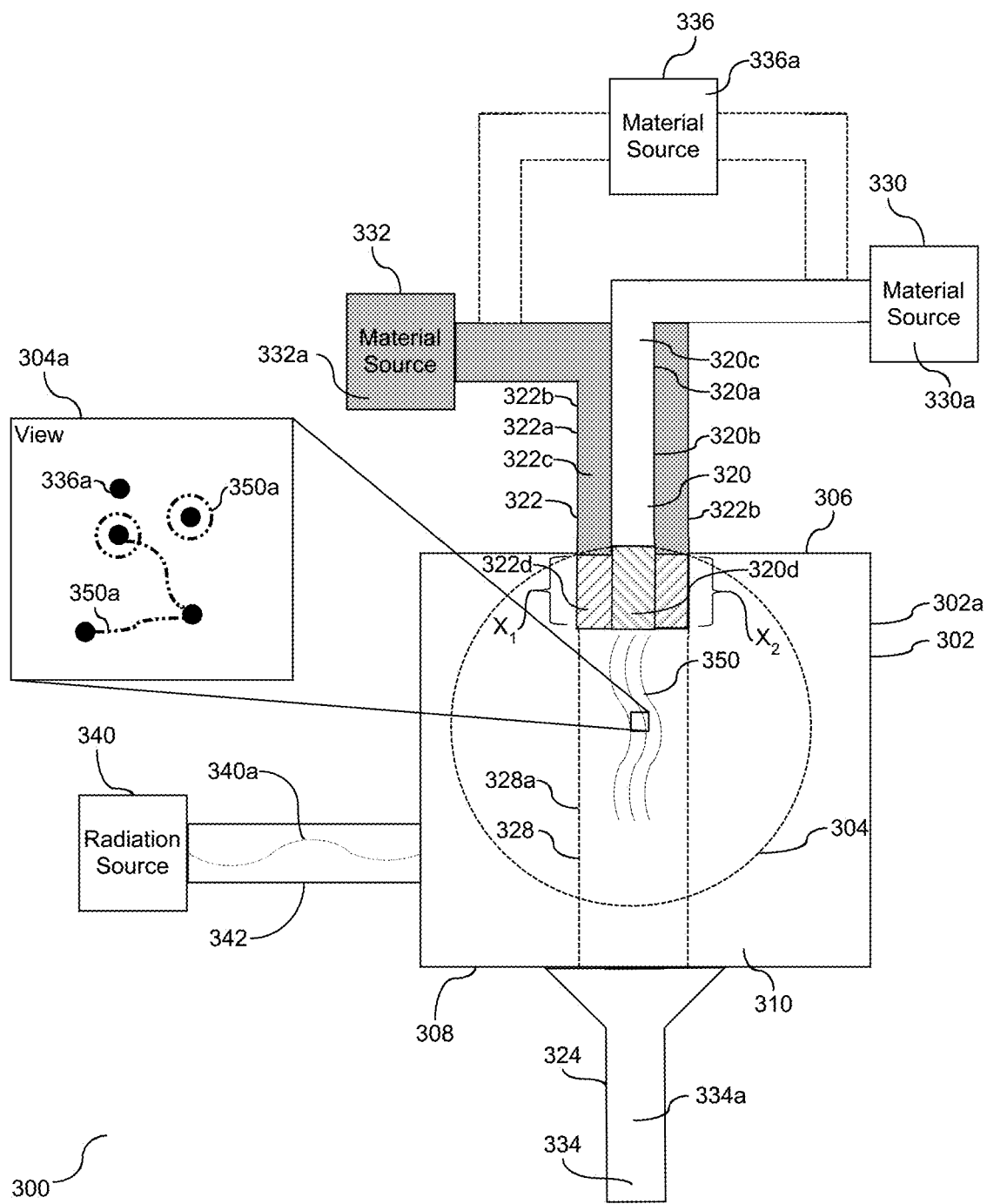
FIG. 3 depicts a block diagram illustrating a flow configuration for processing the precursor material into the product utilizing the non-thermal plasma.

Referring to FIG. 3, a block diagram (300) is provided illustrating a flow configuration for processing the precursor material into the product utilizing the non-thermal plasma. As shown, the vessel (302) is provided with multiple conduits configured in a flow configuration, referred to herein as configuration$_A$. The conduits control ingress and egress of materials to and from a reaction zone (304) within a cavity (310) of vessel (302). For example, a first conduit (320) and a second conduit (322) are provided in communication with a first side (306) of the vessel (302). The first and second conduits, (320) and (322), control and/or facilitate ingress of material(s) to the cavity (310) of vessel (302), including ingress of material(s) to the reaction zone (304). Namely, in flow configuration$_A$, the first conduit (320) is operatively coupled to a first material source (330), and the first conduit (320) controls and/or facilitates ingress of a plasma forming material (330a) provided by the first material source (330) to the reaction zone (304). Similarly, in flow configuration$_A$, the second conduit (322) is operatively coupled to a second material source (332), and the second conduit (322) controls and/or facilitates ingress of a precursor material (332a) provided by the second material source (332) to the reaction zone (304). In one embodiment, the first and second conduits, (320) and (322) are configured in flow configuration$_B$ wherein the first and second material sources (330) and (332) are reversed. For example, in flow configuration$_B$, the first material source (330) provides the plasma forming material (330a) to the second conduit (320) and the second material source (332) provides the precursor material (332a) to the first conduit (322). Accordingly, the first and second conduits, (320) and (322), respectively, control ingress of materials to the reaction zone (304) in different flow configurations.

As shown, the first conduit (320) is positioned within the second conduit (322). The positioning includes forming an annulus (322c) between a first boundary (320b) of the first conduit (320) and a second boundary (322b) of the second conduit (322). In one embodiment, the first conduit (320) is positioned concentrically with respect to the second conduit (322). The material flow through the second conduit (322) passes through the annulus (322c). For example, the precursor material (332a) received from second material source (332), in flow configuration$_A$, flows through the annulus (322c) in the second conduit (322) into the reaction zone (304). The plasma forming material (330a) received from the first material source (330a), in flow configuration$_A$, flows through a cavity (320c) within the first conduit (320) into the reaction zone (304). Accordingly, the positioning of the first and second conduits, (320) and (322), respectively, directs the material flow from the second conduit (322) to encompass the material flow from the first conduit.

In one embodiment, a fifth conduit (328) is positioned within the cavity (310), with the fifth conduit (328) effectively extending through the reaction zone (304). The first and second conduits (320) and (322) are positioned in communication with the fifth conduit (328). In one embodiment, the fifth conduit (328) is an extension of the second conduit (322). The fifth conduit (328) receives the plasma forming material (330a), the precursor material (332a), and the plasma promoter material (336a) from the first and second conduits, (320) and (322), respectively. The fifth conduit (328) facilitates traversal of the reactants and any product(s), such as product (334a), through the reaction zone (304) into stream (334) of the third conduit (324). As shown, the fifth conduit (328) has fifth boundary (328a), which may be constructed of, but not limited to, a microwave radiation transparent material. The material of the fifth boundary (328a) may be any known or conceivable material capable of withstanding the heat, pressure(s), and chemical environmental associated with transporting materials within the respective conduits and/or enabling generation of the non-thermal micro-plasma (350). For example, the fifth boundary (328a) may be, but is not limited to ceramics, and glasses. In one embodiment, the reaction zone (304) is limited to the fifth boundary (328a) of the fifth conduit (328). Accordingly, the fifth conduit (328) controls and facilitates the traversal of the reactants and product(s) through the reaction zone (304) into the third conduit (324).

In one embodiment, the precursor material (332a) has a higher dielectric strength than the plasma forming gas (330a). In flow configuration$_A$, the precursor material (332a) and plasma promoter material (336a) encompasses the plasma forming material (330a) through at least a portion of the reaction zone (304). The precursor material (330a) and plasma promoter material (336a) may act as an energy shield (e.g., shielding material) protecting the vessel boundary (302a) of vessel, and in one embodiment fifth boundary (328a) of the fifth conduit (328a), from being directly exposed to the non-thermal plasma (350). The precursor material (330a) absorbs the heat and/or energy escaping from the non-thermal plasma (350) and limits the heat and/or energy that is in communication with the vessel and fifth boundaries (302a) and/or (328a), respectively. In one embodiment, flow configuration$_A$ enables generation of the non-thermal micro-plasma (350) in a position distal from the vessel boundary (302a) wherein the highest temperature of the reaction zone (304) is not in communication with the vessel boundary (302a) of the vessel (302). Positioning of the non-thermal plasma (350) distal from the vessel boundary (302a) and/or the shielding effect of the precursor material (332a) limits carbon formation on vessel and fifth boundaries, (302a) and/or (328a), respectively. Carbon formed on the vessel and fifth boundaries (302a) and/or (328a), respectively, may absorb microwave energy (340a) before the microwave energy (340a) can facilitate the selective conversion of the precursor material (334a) thus decreasing the efficiency of the precursor processing system. In one embodiment, flow configuration$_A$ operates more efficiently (e.g., less energy and less routine maintenance) than flow configuration$_B$ due the limited carbon formation. Accordingly, the positioning of the first and second conduits, (320) and (322), enhances reactor efficiency and mitigates the need for an additional dedicated shielding gas to protect the vessel boundary (302a) of the vessel (302) from carbon build up.

The exposure of the precursor material (332a) to the microwave radiation (340a) may be initiated prior to interacting with the plasma forming material (330a) and/or non-thermal micro-plasma (350). To support the initiation, the second conduit (322) extends a first distance ($X_1$) into the reaction zone (304) creating a first area (322d) within the second conduit (322) that is within the reaction zone (304). In flow configuration$_A$, while the precursor material (332a) and/or plasma promoter material (336a) is within the first area (322d), the precursor material (332a) is separate from the plasma forming material (330a). In one embodiment, the second conduit (322) has a second boundary (322a) comprised of a microwave transparent material. Thus, since the first area (304) is within the reaction zone (304), the precursor material (332a) is subjected to microwave radiation (340a) from radiation source (340) within the first area (322d). The first distance ($X_1$) may be configured to adjust the quantity of microwave radiation (340a) the precursor material (332a) is subjected to before exiting the second conduit (322) and interacting with the non-thermal micro-plasma (350) and/or plasma forming material (330a). Accordingly, in flow configuration$_A$, the first area (322d) subjects the precursor material (332a) to microwave energy (340a) prior to the precursor material exiting the second conduit (322).

In the first area (322d) of flow configuration$_A$, the molecules and/or atoms of the precursor material (332a) are excited rotationally and/or vibrationally through collisions with other molecules and/or atoms, non-thermal plasma, electrons, and/or ions generated by exposure to the microwave radiation (340a). In one embodiment, excitation of the precursor material (332a) is at an energy level that is not sufficient to immediately rupture the bonds of the molecules and/or atoms within the precursor material (332a) and generate ionic or free-radical states (e.g., generate ions and/or a plasma). In one embodiment, the microwave radiation (340a) within the first area (322d) indirectly excites energy states of atoms and/or molecules which lowers the effective activation energy required for a desired chemical reaction, such as a selective conversion of the precursor material (332a) to the product (334a). In one embodiment, the excited precursor material (332a) interacts with itself, intermediate product(s), and/or a non-excited precursor material within the first area (322d) to form higher hydrocarbon materials (e.g., a hydrocarbon having more carbon atoms than the original precursor material (332a)). Subjecting the precursor material (332a) to microwave radiation prior to exiting the second conduit (322) may enable a higher conversion rate of the precursor material (332a) to product (334a) and/or limit carbon build up on vessel boundary (302a) of vessel (302). Accordingly, the precursor material (332a) is subjected to microwave radiation (340a) prior to interacting with plasma forming material (330a) and/or non-thermal plasma (350).

Exposure of the plasma forming material (330a) to the microwave radiation (340a) may be initiated prior to interacting with the precursor material (332a). To support the initiation of the plasma forming material (330a), the first conduit (320) extends a second distance ($X_2$) into the reaction zone (304) creating a second area (320d) within the first conduit (320) that is within the reaction zone (304). In one embodiment, the first conduit (320) has a first boundary (320a) comprised of a microwave transparent material. Thus, since the second area (320d) is within the reaction zone (304), the plasma forming material (330a) is subjected to microwave radiation (340a) in the second area (320d). The second distance ($X_2$) may be configured to adjust the quantity of microwave radiation (340a) the plasma forming material (330a) is subjected to before exiting the first conduit (320) and interacting with the precursor material (332a). Accordingly, in flow configuration$_A$, the second area (320d) subjects the plasma forming material (330a) to microwave energy (340a) prior to the plasma forming material (330a) exiting the first conduit (320).

In the second area (320d), the molecules and/or atoms of the plasma forming material (332a) are excited rotationally and/or vibrationally by collisions of ions, electrons or other species generated by exposure to the microwave radiation (340a). In one embodiment, the excitation of the plasma forming material (330a) is at an energy level that is not sufficient to immediately rupture the bonds of the molecules and/or atoms within the plasma forming material (330a) and generate ionic or free-radical states (e.g., generate ions and/or a plasma). In one embodiment, the microwave radiation (340a) within the second area (320d) lowers the effective activation energy required for generating a plasma from the plasma forming material (330a). Subjecting the plasma forming material (330a) to microwave radiation (340a) prior to mixing with the precursor material (332a) may enable the non-thermal plasma (350) to be generated more efficiently since collisions between electrons removed from the plasma forming material (330a) and the molecules and/or atoms of the precursor material (332a) are limited. Thus, the free electrons within the plasma forming material (330a) may continue to progress into electrons avalanches with other atoms and/or molecules of the plasma forming material (330a) while avoiding potential quenching from atoms and/or molecules from the precursor material (332a). Accordingly, the plasma forming material (330a) is subjected to microwave radiation (340a) prior to interacting with precursor material (332a).

The reactants may be subjected to microwave energy prior to interaction with one another in a variety of configurations. For example, in FIG. 1, the plasma forming material (130a), precursor material (132a), and/or plasma promoter material (136a) may be subjected to microwave energy (140a) prior to interacting with one another. As shown in FIG. 1, the first conduit (120) is not positioned within the second conduit (122). However, the first conduit (120) is positioned at a first angle ($\alpha_1$) with respect to the second conduit (122); the second conduit (122) is positioned at a second angle ($\alpha_2$) with respect to the first conduit (120); and the first conduit (120) is positioned a distance ($X_3$) from the second conduit (122). The first and second angles, ($\alpha_1$) and ($\alpha_2$), and distance ($X_3$) may affect a direction that the respective reactants flow and thereby the residence time of the reactants within the reaction zone (104) prior to interacting with one another. For example, the second angle ($\alpha_2$) and distance ($X_3$) affect a first travel distance the precursor material (132a) has to traverse within the reaction zone (104) after exiting the second conduit (122) and prior to interacting with plasma forming material (130a). Similarly, the first angle ($\alpha_1$) and distance ($X_3$) affect a second travel distance the plasma forming material (130a) has to traverse within the reaction zone (104) after exiting the first conduit (120) and prior to interacting with precursor material (132a). The residence time of the reactants within the reaction zone (104) prior to communicating with and/or otherwise interacting with one another is based on the first and second travel distances, diffusive properties of the reactants, and velocity of the respective reactants. Accordingly, the plasma forming material (130a) and/or precursor material (132a) may be subjected to microwave energy (140a) prior to interacting with one another in a variety of different vessel configurations.

Figure 4:
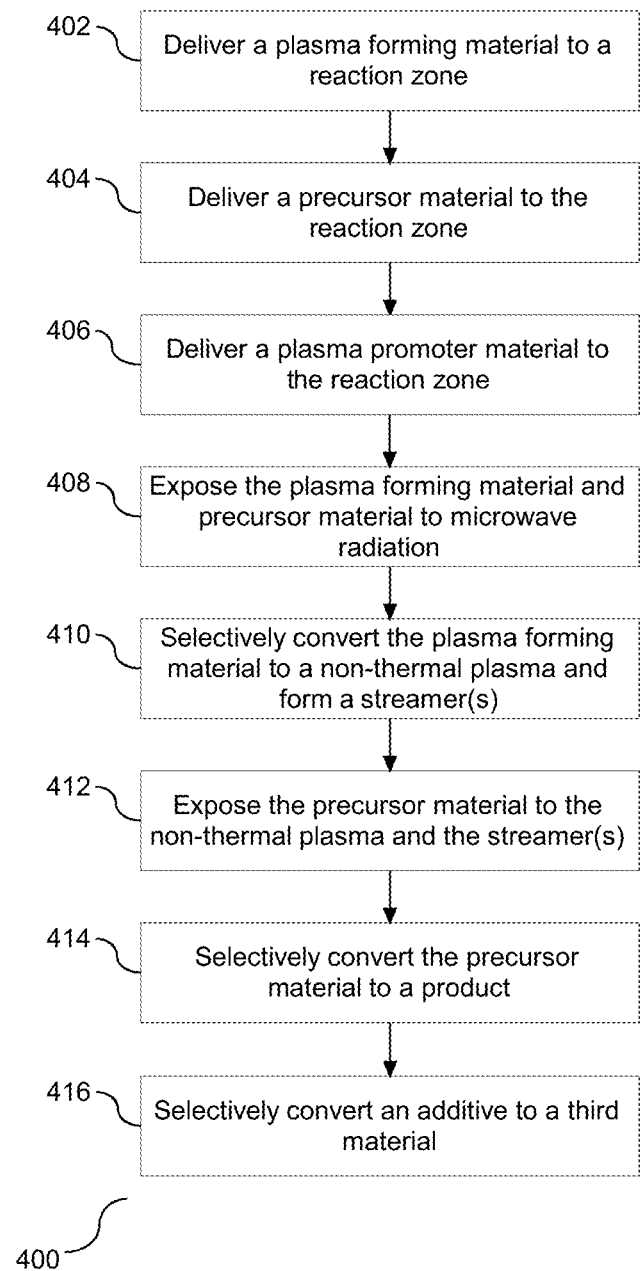
FIG. 4 depicts a flow chart illustrating a method for processing the precursor material into the product utilizing the non-thermal plasma.

Referring to FIG. 4, a flow chart (400) is provided illustrating a method for processing the precursor material into the product utilizing the non-thermal plasma. As shown, a plasma forming material is delivered (e.g., provided) to a reaction zone (402), a precursor material is delivered (e.g., provided) to the reaction zone (404), and a plasma promoter material is deliver to the reaction zone (406). In one embodiment, at least one of the plasma forming material and the precursor material includes an additive such as, but not limited to, carbon black, coal, biochar, biomass, graphite, structured carbon, carbon dioxide, carbon monoxide, and hydrogen. The reaction zone is exposed to microwave radiation (408), including exposing the plasma forming material and the precursor material to the microwave radiation. The exposure of the plasma forming material to the microwave radiation selectively converts the plasma forming material to a non-thermal micro-plasma (410) including selectively converting the plasma forming material into micro-plasma. In one embodiment, the exposure selectively converts the plasma forming material to one or more streamers. In one embodiment, the conversion of the plasma forming material to the non-thermal plasma is initiated prior to mixing the plasma forming material with the precursor material. In one embodiment, the plasma forming material is maintained separate from the plasma forming material during initiation of exposure of the plasma forming material to the microwave radiation. Accordingly, the non-thermal plasma, including the one or more streamers, is generated within the reaction zone from the plasma forming material.

The precursor material interacts with the plasma forming material (412). During the interaction the precursor material is exposed to the non-thermal plasma including exposure to the micro-plasma. In one embodiment, the precursor material is exposed to the one or more streamers. In one embodiment, the exposure of the precursor material to the microwave radiation is initiated prior to exposure of the precursor material to the non-thermal plasma. In one embodiment, the precursor material is maintained separate from the plasma forming material during initiation of the exposure of the precursor material to the microwave radiation. The exposure of the precursor material to the non-thermal plasma and the microwave radiation selectively converts the precursor material to a product (414). In one embodiment, the product comprises a carbon enriched material and a hydrogen enriched material. In one embodiment the conversion of the precursor material to the product is enhanced (e.g., activation energy is lowered and/or conversion yield increased) by the additive. In one embodiment, the additive is selectively converted to a third material from exposure of the additive to the microwave radiation and/or non-thermal micro-plasma (416). Accordingly, the precursor material is selectively converted into the product by the non-thermal plasma.

EXAMPLE

In one example, a precursor processing system was configured similar to the configuration of the system in FIG. 3 to process methane into graphitic materials, such as graphene, utilizing non-thermal plasma. The system was in flow configuration$_A$. Namely, methane is the precursor material (332a) and the second conduit (322) is configured to flow the methane through the annulus (322c) between the second surface (322b) of the second conduit (322) and the first surface (320b) of the first conduit (320) into the reaction zone (304). The methane was 23% methane and 77% argon by volume. The methane was flowing through the reaction zone at a GHSV of 12,000 per hour.

The plasma forming gas was argon and the first conduit (320) was configured to flow the argon into the reaction zone (304). The argon was 99.9% argon by weight. The argon was flowing through the reaction zone at a GHSV of 2,600 per hour. Carbon black is the plasma promoter material (336a) and is entrained within the flow of argon through the first conduit (320). The carbon black was introduced to the reaction zone at 0.06 grams per liter of gas reactant flow (e.g., grams of carbon black per liter of gas flow (e.g., argon)). The argon, methane, and carbon black were introduced to the reaction zone (304) at a temperature between 280 degrees Kelvin and 310 degrees Kelvin and 1 atmosphere of pressure. Accordingly, the system was configured in flow configuration$_A$ with the methane and carbon black encompassing the argon through at least a portion of the reaction zone.

The vessel (304) was configured to generate micro-plasma and streamers. Namely, the first, second, and third conduits, (320), (322), and (324) were comprised of quartz. The second conduit (322) was an extension of the fifth conduit (328). The second conduit (322) was used within the cavity of the vessel to control and facilitate the traversal of the reactants and product(s) (e.g., graphene) through the reaction zone (304) into the third conduit (324). The reaction zone (304) was 2.2 centimeters in diameter by 15 centimeters in length. The vessel (302) was comprised of aluminum and the vessel (302) had a 9 centimeter internal diameter. The radiation source (340) was a magnetron connected to the chamber (302) by a waveguide (342) comprised of aluminum. The microwave radiation (340a) was at a frequency of 2.45 GHz at a concentration within the reaction zone of 9 kW per liter. Upon exposure of the reactants to the microwave radiation (340a), a non-thermal plasma (250) was generated within the reaction zone (304), including the generation of micro-plasma (250a) and streamers (250c). The non-thermal plasma (250) interacted with the reactants to form graphitic materials (334a), such as graphene. The conversion rate of methane to product(s) was measured to be 36% on a molar basis. Accordingly, methane was processed into products including at least a portion of the product being graphene utilizing non-thermal micro-plasma.

An Ocean Optics HR2000+ES—Emission Spectrometer, hereinafter Spectrometer, was used to measure the emission spectra of the non-thermal plasma within the reaction zone. The Spectrometer has detectable range of 190-1100 nanometers and a 0.9 full width half maximum resolution. The emissions detected by the Spectrometer are excited and/or ionized species within the reaction zone. For example, ionized argon emissions appear between 650 and 900 nanometers (e.g., argon lines at 696 and 751 nanometers) while $C_2$ emission bands are present between 400 and 600 nanometers. The $C_2$ emission bands are indicative of graphitic compound formation such as graphene and/or excitation of a plasma promoter material such as, but not limited to, carbon black. Non-excited and non-ionized species may not be detected by the Spectrometer. The emission spectra of the non-thermal plasma were captured at varying distances along a length of the reaction zone. Accordingly, the Spectrometer monitors the characteristics of the non-thermal plasma.

Figure 5:
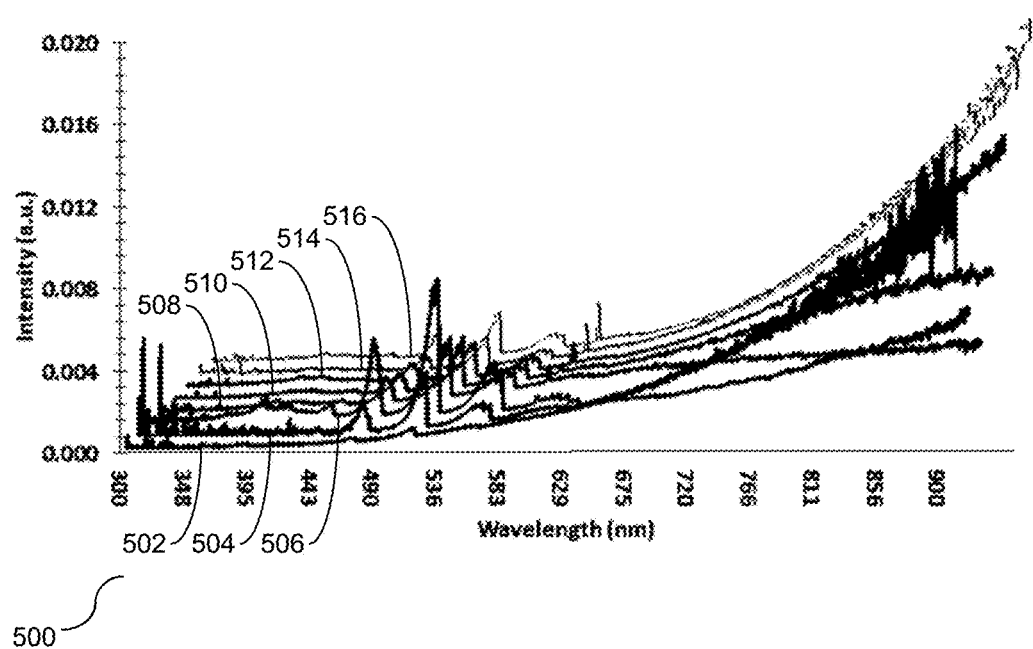
FIG. 5 depicts a graph illustrating the emission spectra of the non-thermal plasma with respect to a distance traversed through the reaction zone.

Referring to FIG. 5, a graph (500) is provided illustrating an emission spectra of the non-thermal plasma with respect to a distance traversed through the reaction zone. The first emission spectrum (502) was taken at a position closest to the inlet of the reaction zone (504). Each successive emission spectrum, (504)-(516), is positioned further from the inlet with the eighth emission spectrum (516) being closest to an outlet of the reaction zone (504). As shown, the first emission spectrum (502), captured at 0.95 centimeters from the inlet and the second emission spectrum (504), captured at 3.0 centimeters from the inlet, show minimal excited species are present and blackbody radiation is present (e.g., increase in intensity of the spectra at greater than 550 nm) due to formation of micro-plasma (250a). At 3 centimeters from the inlet, the convergence point (250d) of the micro-plasma (250a) and the streamers (250c) were visibly present and the reactants have begun to mix. The second emission spectrum (504), captured at 3 centimeters from the inlet, shows an increase in $C_2$ emissions compared to the first emission spectrum (502). The change in emissions indicates the micro-plasma (250a) is more intensive in the second emission spectrum (504) as compared to the first emission spectrum (502) and the conversion of the methane into products has been initialized. The micro-plasma (250a) in the second emission spectrum (504) is primarily composed of carbon species such as, but not limited to, $C_2$. At 4.8 centimeters from the inlet, the convergence point (250d) is visibly present. The third emission spectrum (506), captured at 4.8 centimeters from the inlet, shows the $C_2$ emissions increase to a maximum point and blackbody emissions are lower as compared to the first and second emission spectra, (502) and (504), respectively, indicating energy transfer from the micro-plasma (250a) to the methane. Accordingly, as shown, the non-thermal plasma is dynamically changing within the reaction zone.

Additional emission spectra were captured throughout the length of the reaction zone (304). For example, a fourth emission spectrum (508) was captured at 6.7 centimeters from the inlet; a fifth emission spectrum (510) was captured at 8.6 centimeters from the inlet; a sixth emission spectrum (512) was captured at 10.5 centimeters from the inlet; a seventh emission spectrum (514) was captured at 12.4 centimeters from the inlet; and the eighth emission spectrum (516) was captured at 14.3 centimeters from the inlet. At distances, 6.7, 8.6, 10.5, 12.4, and 14.3 centimeters, the $C_2$ emissions bands continue to remain present within the respective emission spectrum, (508), (510), (512), (514), and (516) while the ionized argon species emission is minimal. Accordingly, the emission spectra of $C_2$ band region of the reaction zone (304) are relatively unchanged after 6.7 centimeters from the inlet of the reaction zone (304) to the outlet of the reaction zone (304).

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising,"

when used in this specification, specify the presence of stated features, integers, steps, operations, elements, and/or components, but do not preclude the presence or addition of one or more other features, integers, steps, operations, elements, components, and/or groups thereof.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Microwave radiation is utilized to generate a non-thermal plasma including streamers to facilitate the conversion of the precursor material(s) to the product(s) while minimizing carbon build up and/or energy consumption. In one embodiment, the streamers enable the same (or higher) conversion rates and/or product selectivity than prior processes (e.g., thermal plasma) with a lower microwave radiation density within the reaction zone than the prior processes.

It will be appreciated that, although specific embodiments have been described herein for purposes of illustration, various modifications may be made without departing from the spirit and scope of the embodiments. In particular, the vessel may be configured in a variety of flow configurations and orientations. For example, the first conduit may be in communication with a proximal side of the vessel that is oppositely positioned to a distal side of the vessel that the second conduit is in communication with. Accordingly, the scope of protection of these embodiments is limited only by the following claims and their equivalents.

What is claimed is:

1. A method comprising: providing, to a reaction zone:
a hydrocarbon precursor material,
a plasma forming material, and
a plasma promoter material comprising solid particles dispersed within a gas flow;
exposing, in the reaction zone, the received plasma forming material and the received plasma promoter material to microwave radiation, the dispersed solid particles of the plasma promoter material causing initiation of a non-thermal micro-plasma proximal to the plasma promoter material;
upon conversion of the plasma forming material to the non-thermal micro-plasma, mixing the plasma forming material with the hydrocarbon precursor material; and
exposing the hydrocarbon precursor material to the non-thermal micro-plasma and the microwave radiation, the exposure of the hydrocarbon precursor material selectively converting the hydrocarbon precursor material to a product including a carbon enriched material and a hydrogen enriched material.

2. The method of claim 1, wherein the hydrocarbon precursor material includes one or more first materials selected from the group consisting of: aromatic, alkylated aromatic, paraffinic, olefinic, cycloolefin, napthenic, alkane, alkene, alkyl cycloalkane, alkylated cycoalkane, alkyne, alcohol, and a hydrocarbon comprising a heteroatom.

3. The method of claim 1, wherein the hydrocarbon precursor material includes one or more first materials selected from the group consisting of: methane, ethane, propane, butane, syngas, natural gas, methanol, ethanol, propanol, butanol, hexane, benzene, paraffin, and naphthalene.

4. The method of claim 1, wherein at least one of the hydrocarbon precursor material and plasma forming material includes one or more first materials selected from the group consisting of: carbon monoxide, carbon dioxide, argon, synthesis gas, hydrogen, hydrogen sulfide, water, helium, nitrogen, oxygen, air, and recycled gas.

5. The method of claim 1, wherein the plasma forming material includes one or more first materials selected from the group consisting of: carbon monoxide, carbon dioxide, argon, synthesis gas, hydrogen, hydrogen sulfide, water, helium, nitrogen, oxygen, air, hydrocarbon precursor material, and recycled gas.

6. The method of claim 1, wherein the plasma promoter material includes one or more first materials selected from the group consisting of: carbon black, coal, biochar, biomass, graphite, activated carbon, a transition metal, a supported transition metal, and structured carbon.

7. The method of claim 6, further comprising the one or more first materials accelerating the conversion of the hydrocarbon precursor material to the product utilizing the non-thermal micro-plasma.

8. The method of claim 6, further comprising:
exposing the one or more first materials to the non-thermal micro-plasma and the microwave radiation, the exposure of the one or more first materials selectively converting the one or more first materials to an upgraded second material.

9. The method of claim 1, wherein the plasma forming material includes one or more first materials selected from the group consisting of: argon, hydrogen, helium, neon, krypton, xenon, carbon dioxide, nitrogen, and water.

10. The method of claim 1, wherein the carbon enriched materials have a hydrogen atom to carbon atom ratio of less than or equal to 1.

11. The method of claim 1, wherein the carbon enriched materials include one or more first materials selected from the group consisting of: graphitic material, amorphous carbon, structured carbon, and ordered carbon.

12. The method of claim 1, wherein the carbon enriched materials include one or more first materials selected from the group consisting of: graphene and graphite.

13. The method of claim 1, wherein the hydrogen enriched materials have a hydrogen atom to carbon atom ratio of greater than 1.

14. The method of claim 1, wherein the hydrogen enriched materials include one or more first materials selected from the group consisting of: hydrogen, ethylene, acetylene, butadiene, and butane.

15. The method of claim 1, further comprising recycling an output of the reaction zone, including selectively returning at least one of an unconverted hydrocarbon precursor material, the plasma promoter material, and the plasma forming material to the reaction zone.

16. The method of claim 1, further comprising:
positioning a first conduit and a second conduit proximal to the reaction zone, wherein the first conduit channels the plasma forming material; and
positioning the first conduit within the second conduit, the positioning includes forming an annulus between a first surface of the first conduit and a second surface of the second conduit, wherein the annulus channels the hydrocarbon precursor material;
wherein at least one of the first conduit and the annulus channels the promoter material.

17. The method of claim 1, further comprising:
orienting the reaction zone with respect to an outlet, wherein one or more solid particles free-fall through the outlet.

18. The method of claim 1, wherein the microwave radiation is less than about 30 kilowatts per liter within the reaction zone.

19. The method of claim 1, wherein the non-thermal micro-plasma has a non-uniform radiation intensity within the reaction zone.

20. The method of claim 1, wherein the non-thermal micro-plasma is less than 8,000 degrees Kelvin.

21. The method of claim 1, further comprising:
initiating exposure of the hydrocarbon precursor material to the microwave radiation prior to exposing the hydrocarbon precursor material to the non-thermal micro-plasma.

22. The method of claim 21, further comprising initiating exposure of the plasma forming material to the microwave radiation during the maintenance of the separation.

23. The method of claim 1, wherein the microwave radiation is between 36 megahertz and 300 gigahertz.

24. The method of claim 1, further comprising the non-thermal micro-plasma generating one or more streamers.

25. The method of claim 24, wherein the one or more streamers initiate a second non-thermal micro-plasma.

26. The method of claim 1, wherein the micro-plasma extends between two particles of the plasma promoter material.

* * * * *